United States Patent
Nakamura et al.

(10) Patent No.: US 11,657,129 B2
(45) Date of Patent: May 23, 2023

(54) ROBOT OPERATION TERMINAL

(71) Applicant: DENSO WAVE INCORPORATED, Chita-gun (JP)

(72) Inventors: Mizuki Nakamura, Chita-gun (JP); Hirota Touma, Chita-gun (JP); Tomoya Yamamoto, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 167 days.

(21) Appl. No.: 17/117,989

(22) Filed: Dec. 10, 2020

(65) Prior Publication Data

US 2021/0182368 A1    Jun. 17, 2021

(30) Foreign Application Priority Data

Dec. 16, 2019    (JP) .............................. JP2019-226402

(51) Int. Cl.
*G06F 21/31* (2013.01)
*G05B 19/4155* (2006.01)
*G06F 9/4401* (2018.01)

(52) U.S. Cl.
CPC ......... *G06F 21/31* (2013.01); *G05B 19/4155* (2013.01); *G06F 9/4401* (2013.01); *G05B 2219/50391* (2013.01)

(58) Field of Classification Search
CPC ....................................................... G06F 21/31
See application file for complete search history.

(56) References Cited

U.S. PATENT DOCUMENTS

| | | | |
|---|---|---|---|
| 6,705,060 B1 * | 3/2004 | McGuinness | B65B 25/24 53/409 |
| 2018/0373852 A1 * | 12/2018 | Tsubota | B25J 9/0003 |

FOREIGN PATENT DOCUMENTS

JP    2005-131747 A    5/2005

* cited by examiner

*Primary Examiner* — Gustavo Polo
(74) *Attorney, Agent, or Firm* — Oliff PLC (57) ABSTRACT

A robot operation terminal includes multiple application programs. The robot operation terminal is connected to a controller that controls a robot, and the robot operation terminal receives an input operation carried out by an operator to operate or set the robot. In each of application programs, a necessity of an inbuilt login is set to confirm an operation authority of the operator.

15 Claims, 8 Drawing Sheets

FIG. 10

ROBOT OPERATION TERMINAL

CROSS REFERENCE TO RELATED APPLICATION

The present application claims the benefit of priority from Japanese Patent Application No. 2019-226402 filed on Dec. 16, 2019. The entire disclosure of the above application is incorporated herein by reference.

TECHNICAL FIELD

The present disclosure relates to a robot operation terminal which receives an operation made by an operator to operate a robot.

BACKGROUND

Conventionally, robot operation terminals, such as teaching pendants have been known.

SUMMARY

A robot operation terminal includes multiple application programs. The robot operation terminal is connected to a controller that controls a robot, and the robot operation terminal receives an input operation carried out by an operator to operate or set the robot. In each of application programs, a necessity of an inbuilt login is set to confirm an operation authority of the operator.

BRIEF DESCRIPTION OF DRAWINGS

Objects, features and advantages of the present disclosure will become apparent from the following detailed description made with reference to the accompanying drawings. In the drawings.

DETAILED DESCRIPTION

Recently, robot operation terminals, such as teaching pendants have improved processing capability, high communication speed, high resolution of image displayed on the screen, and also become more multifunctional with installation of multiple application programs. For an industrial robot adopted as a production equipment in factories, etc., malicious operations or erroneous operations are required to be avoided in order to prevent the robot from destroying articles positioned around the robot and ensure human safety.

Furthermore, the role of operator differs in each stage of product life cycle of the industrial robot, such as development, manufacturing, application to a specific utilization by system integrator, field operation, maintenance, and research. In a case where the robot is operating in the production field, an unspecified number of operators may operate the robot using the operation terminal.

As described above, the robot operation terminal has various needs. From the viewpoint of ensuring safety, in some robot operation terminals, before inputting an operation to the robot operation terminal, the operation terminal identifies the operator or operation authority of the operator by login process similar to a personal computer.

However, the current robot operation terminals have two types. One type is the operation terminal that requires login process, and the other type is the operation terminal that does not require login process. When executing various application programs having different functions, current robot operation terminal cannot identify appropriate operator.

According to an aspect of the present disclosure, a robot operation terminal includes multiple application programs. The robot operation terminal is connected to a controller that controls a robot, and the robot operation terminal receives an input operation carried out by an operator to operate or set the robot. In each of application programs, a necessity of an inbuilt login is set to confirm an operation authority of the operator.

With this configuration, after confirming the necessity of operation authority according to the functions of the application programs, the operator is permitted to operate the corresponding application programs. This configuration improves the safety of the operation terminal when operating the robot using the operation terminal.

The application programs may include a predetermined application that is started, as a startup application, immediately after the robot operation terminal is powered on.

With this configuration, in a case where the startup application does not require the operator to perform the inbuilt login, the operator can immediately execute the application program. In a case where the application program requires the operator to perform the inbuilt login, the application program is executed after confirming the safety by performing the inbuilt login.

The predetermined application started as the startup application may not require the inbuilt login of the operator and enables the operator to instruct a basic operation to the robot.

By setting the operation terminal application as the startup application, the operator can immediately operate the robot at the field site of the robot without performing inbuilt login.

The robot operation terminal may further include a management application program that manages processes executed in response to activation of the application programs. The management application program is configured to be activated before the startup application in response to the input operation carried out by the operator. The management application program executes a management login which confirms an operation authority of the operator. The management application program further determines whether the operator has the operation authority to operate one of the application programs selected by the operator.

In response to determining that the operator having the operation authority, the management application program hands over a process to the one of the application programs selected by the operator. In response to determining that the operator not having the operation authority, the management application program executes the management login before handing over the process to the one of the application programs selected by the operator. In a case where the one of the application programs selected by the operator requires the inbuilt login, the management application program instructs the operator to perform the inbuilt login.

With this configuration, the operation authority of the operator can be confirmed by the management login of the management program only. Alternatively, the operation authority can be confirmed in two stages of the management login in the management program and the inbuilt login of the application program selected by the operator. In the configuration where the operation authority of the operator is confirmed by the management login of the management program only, the operator whose operation authority has been confirmed by the management login can eliminate the subsequent inbuilt login of the selected application program. Further, with the two-stage confirmation of operation authority, an operation safety of the robot can be further improved.

The application programs may include an application program which further requires one or more inbuilt logins having different operation authority levels during an execution of the application program.

With this configuration, in a case where multiple functions are executed by one application program, the operation authority of the operator can be confirmed before the execution according to the content of each function.

The application program which further requires one or more inbuilt logins may have three different operation authority levels.

In a configuration where the operation authority of the operator is set in three or more stages, the required level of operation authority can be appropriately set according to the functions of the application program.

The robot operation terminal may further include a display screen which displays a status bar at a predetermined portion of the display screen. The status bar displays, with use of symbols, an operation item for switching an operation state of the robot and state information items related to the robot.

With this configuration, the operator can be notified of the operating state of the robot by referring to the status bar during the operation of the robot. The operator can easily change the operating state of the robot by operating the displayed operation items.

According to another aspect of the present application, a robot operation terminal includes a processor and a memory in which multiple application programs are installed. The application programs are executed by the processor. The robot operation terminal is connected to a controller that controls a robot, and receives an input operation carried out by an operator to operate or set the robot. In each of the application programs, a necessity of an inbuilt login is set to confirm an operation authority of the operator.

Figure 1:
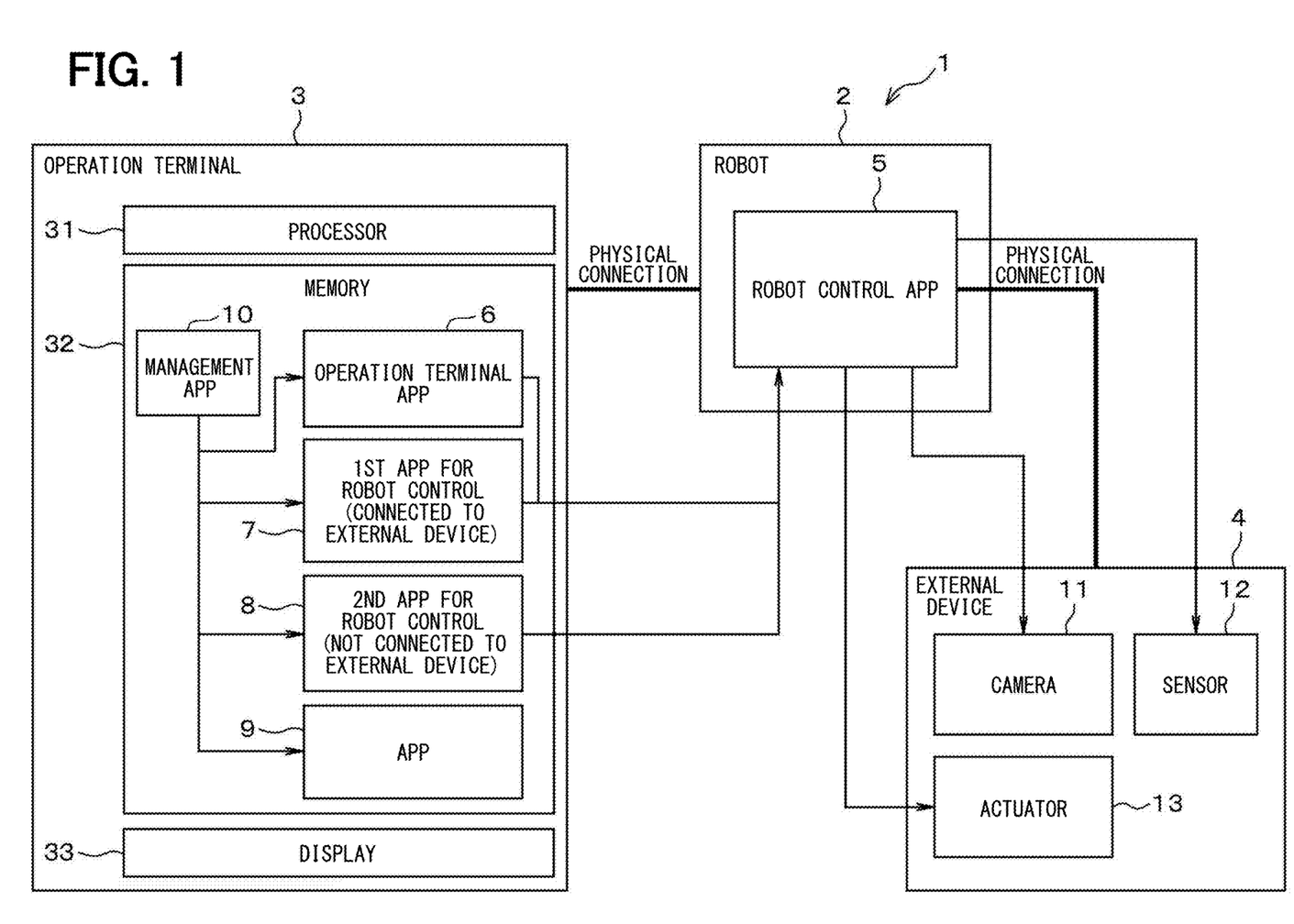
FIG. 1 is a functional block diagram showing a configuration of a robot control system according to an embodiment of the present disclosure.

Hereinafter, an embodiment of the present disclosure will be described with reference to the drawings. As shown in FIG. 1, a robot control system 1 according to the present embodiment includes a robot 2, an operation terminal 3 connected to the robot 2, and an external device 4 connected to the robot. The robot 2 includes a robot main body and a controller that controls the robot main body. The controller of the robot 2 is installed with a robot control application 5, which is an application program for controlling the robot 2. Hereinafter, application program is also referred to as an application or an app.

The operation terminal 3 is installed with an operation terminal application 6 and other optional applications 7 to 9. The optional applications 7 and 8 are both applications capable of operating the robot 2. The optional application 7 is connected to the external device 4, and controls the eternal device 4 and receives a signal transmitted from the external device 4. The optional application 8 is not connected to the external device 4. The operation terminal application 6 allows the operator to change settings of the operation terminal 3, and instructs the operator to perform basic and simple operations of the robot 2. Further, a management application 10 is installed in the operation terminal 3. The management application 10 manages the processes executed by other applications 6 to 9, and corresponds to a management program.

The operation terminal includes a processor 31 for executing the application programs and a memory 32. The application programs are installed in the memory 32 and executed by the processor 31 to perform corresponding functions. The memory 32 is a non-transitory tangible computer-readable memory.

The external device 4 includes, for example, a camera 11, a sensor 12, and an actuator 13. The camera 11 acquires, for example, image information necessary for operating the robot 2, and inputs the image information to the controller of the robot 2. Similarly, the sensor 12 acquires sensing information necessary for operating the robot 2, and inputs the sensing information to the controller of the robot 2. The actuator 13 is, for example, a servomotor that is a control target other than the robot 2. The external device 4 including above-described components is controlled by the robot control application 5. The communication of each signal among the robot 2, the operation terminal 3, and the external device 4 is performed via a physical connection line shown in the figures or via a circuit line.

Figure 2:
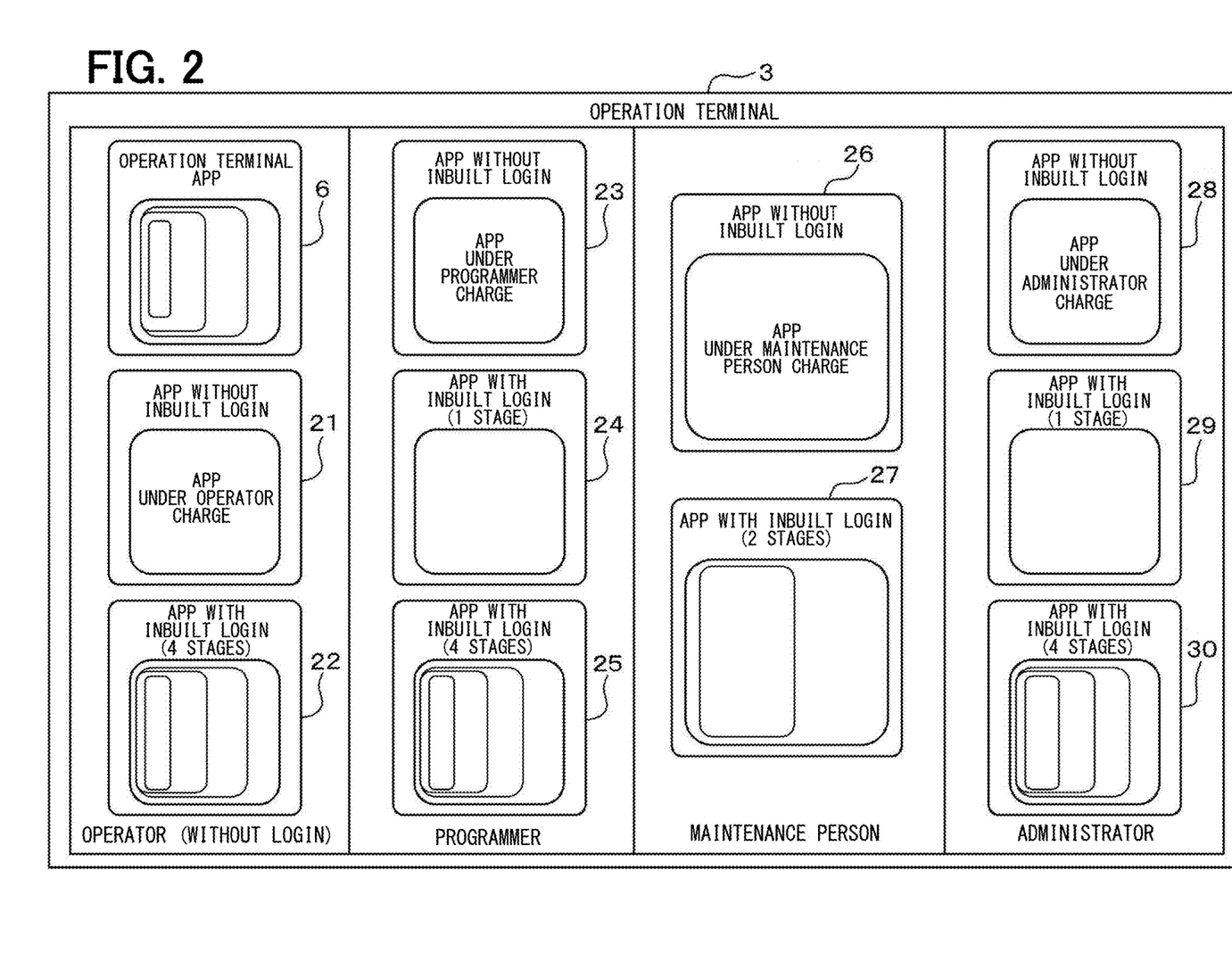
FIG. 2 is a diagram showing different examples of application programs installed in an operation terminal.

Further, although FIG. 1 shows four applications 6 to 9 as examples, the number of application programs actually installed in the operation terminal 3 may be greater than four. FIG. 2 shows multiple applications classified in different categories. In the present embodiment, an inbuilt login process is set in each application. For the operator who operates the operation terminal 3, for example, four level authority including level 1 to level 4 is set as follows. The level 1 is the lowest authority level.

1. Operator
2. Programmer
3. Maintenance person
4. Administrator

The operator is a person who does not need to login to the operation terminal 3. The programmer, the maintenance person, and the administrator all need to login to the operation terminal 3. Hereinafter, the operator may also be referred to as a user.

The operator can execute the operation terminal application 6 and the application 21 without the inbuilt login process of the application. For executing the application 22, the inbuilt login process needs to be performed. Four stages in the application 22 means that four different login processes need to be performed for executing the application 22 to four different stages. Hereinafter, the inbuilt login process may also be referred to as inbuilt login. The login executed by the management application 10 is referred to as management login.

The programmer can execute applications 23 to 25 in addition to the above-mentioned applications that can be executed by the operator. The application 23 can be executed without the inbuilt login process, and the applications 24 and 25 require execution of the inbuilt login process. Similar to the application 22, for executing the application 25 to four different stages, four different login processes need to be executed as shown by four stages.

The maintenance person can execute applications 26 and 27 in addition to the applications that can be executed by the programmer. The application 26 can be executed without the inbuilt login process, and the application 27 requires execution of the inbuilt login process. For executing the application 27 in two different stages, two different login processes need to be executed as shown by two stages in the drawing.

The administrator can execute applications 28 to 30 in addition to the applications that can executed by the maintenance person. The application 28 can be executed without the inbuilt login process, and the applications 29 and 30 require execution of the inbuilt login process. Similar to the application 22, for executing the application 30 to four different stages, four different login processes need to be executed as shown by four stages.

Figure 3:
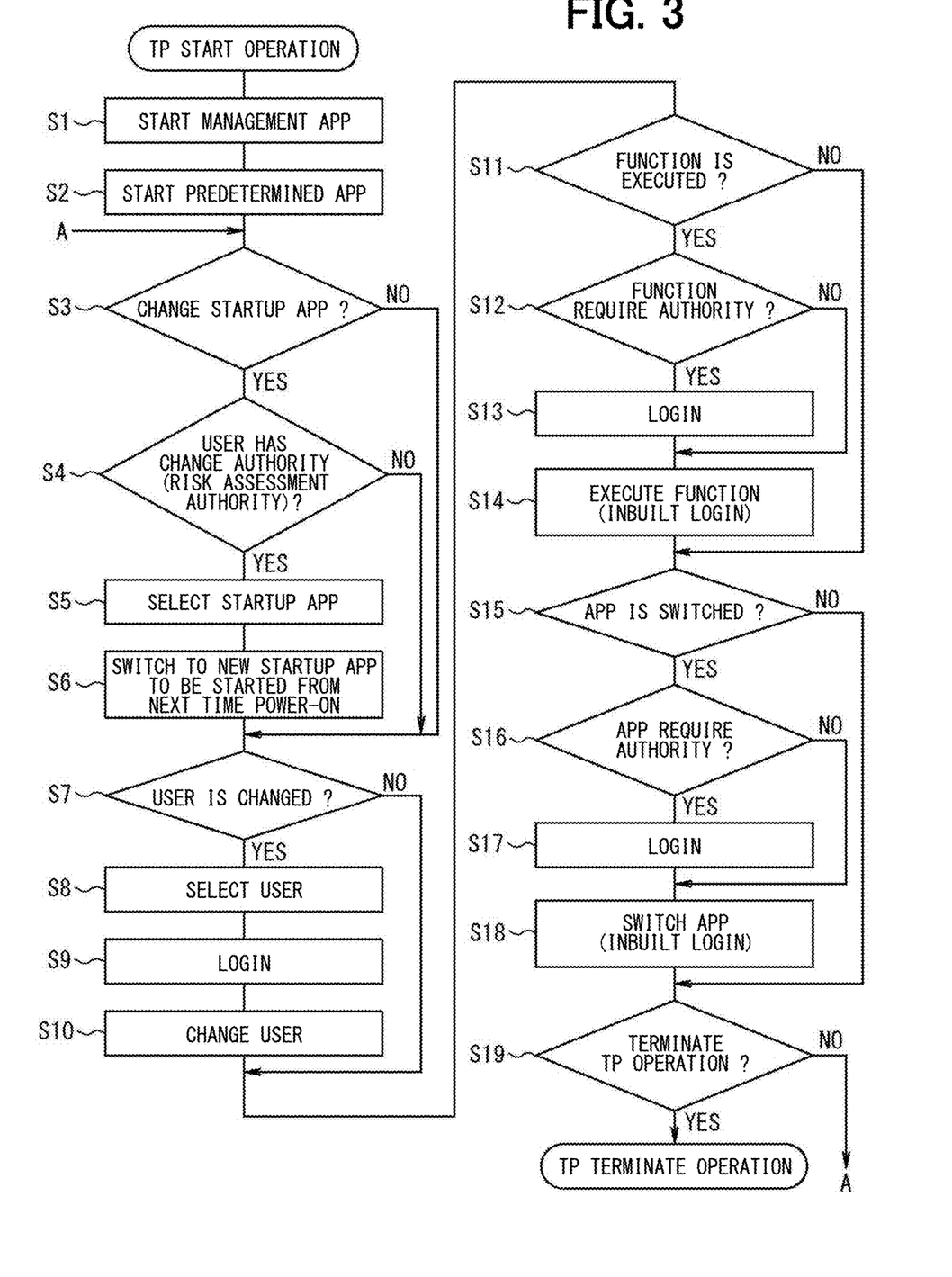
FIG. 3 is a flowchart showing a main process executed by the operation terminal.

The following will describe an operation of the operation terminal according to the present embodiment. In FIG. 3, "TP" is abbreviation of "teaching pendant" and is an example of the operation terminal 3. As shown in FIG. 3, in response to power-on of the operation terminal 3, the management application 10 is started first in S1, and then a predetermined application set in advance by selection is started in S2. Under a condition that the user does not change the setting, usually, the operation terminal application 6 is started in S2.

The management application 10 proceeds to S7 when no change is made (S3: NO) to a startup application, which is the application started in S2. When a change is made (S3: YES) to the startup application, the operation terminal determines in S4 whether the current user has the operation authority to make the change, for example, a risk assessment authority. The current user is a user who previously operated the operation terminal 3 unless the startup application is changed. When the current user does not have the operation authority to the startup application (S4: NO), the process proceeds to S7. When the current user has the operation authority to the startup application (S4: YES), the operation terminal receives a new startup application selected by the user in S5, and the management application 10 changes the current startup application to the new startup application in S6 which will be started from next time power-on.

In S7, in response to a user change, that is a different user from the last time user (S7: YES), the user selectively performs the management login operation on the management application 10 in S8 and S9, and changes the user in S10. Then, the process proceeds to S11. In S7, in response to no user change (S7: NO), the process proceeds to S11 from S7.

When the user selects to execute the function of the startup application in S11 (S11: YES), the management application 10 determines whether the operation authority is required for the function in S12. The function is not limited to the entire functions executed by the startup application. In a case where the startup application is configured to selectively execute part of functions, the operation authority may be determined for the function selected by the user among multiple functions. In response to determining that the operation authority is required for the function to be executed (S12: YES), the management application 10 instructs the user to carry out the management login in S13.

As the default startup application, the operation terminal application 6 that does not require the inbuilt login process and allows the operator to instruct the basic operation of the robot may be set for user convenience. By setting the operation terminal application as the startup application, the operator can immediately operate the robot 2 at the field site of the robot 2 without performing inbuilt login process.

In S14, the management application 10 hands over the process to the startup application to execute the function of the startup process. In a case where the startup application requires the inbuilt login to execute entire or part of the functions of the startup program, the inbuilt login process is executed in S14. Then, the process proceeds to S15. In S11, when the user does not execute the function of the startup application (S11: NO), the process proceeds to S15 from S11.

When the user selects to switch the application in S15 (S15: YES), the management application 10 determines in S16 whether the operation authority is required for the function of another application to which the user switched. In response to determining that operation authority is necessary (S16: YES), the management application 10 instructs the user to execute management login process in S17, and switches the application in S18. Then, the process is handed over to the application after switch. In a case where the application after switch requires the inbuilt login to execute entire or part of the functions of the application, the inbuilt login process is executed in S18. After that, the user continues the operation of the operation terminal 3 (S19: NO), the process returns to S3.

FIG. 3 does not show the processing when it is determined that the user does not have the operation authority as a result of each login process. In this case, for example, a login by a different user may be requested, or the operation of the operation terminal 3 may be stopped.

By controlling as described above, the login process in the operation terminal 3 of the present embodiment has the following four login modes.

(1) No login
(2) Inbuilt login only
(3) Management login only
(4) Inbuilt login and management login The login modes (1) and (2) are suitable to an application which has the function to be used in the operation terminal 3 is independent of the function of the robot 2. For example, the login modes (1) and (2) are suitable to a production support software that manages tables and edits documents.

The login mode (3) is suitable to an application which has the function to be used is included in the function of the robot 2. For example, the login mode (3) is suitable to a software that has a control function of the robot 2, such as a mode switching function or a control program of the robot 2.

The login mode (4) is suitable to an application which has a function partially overlapped with a part of the function of the robot 2. For example, the login mode (4) is suitable to a software that has a control function of an external device 4, such as changing settings of the camera 11 or the sensor 12.

Figure 4:
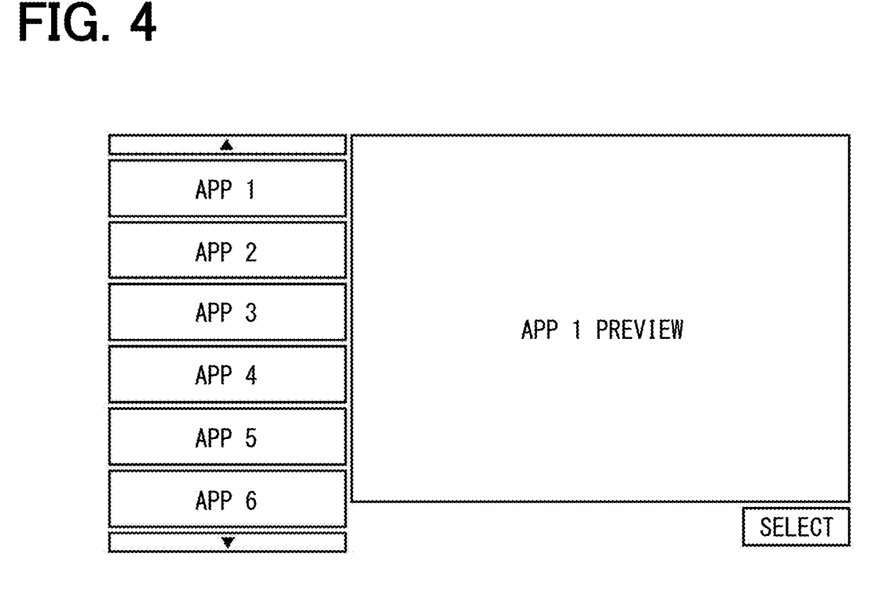
FIG. 4 is a diagram showing an example of an initial display of the operation terminal displayed after the operation terminal is powered on and started.

FIG. 4 to FIG. 7 are diagrams showing examples of an initial display image displayed on a display screen 33 of the operation terminal 3 after the operation terminal 3 is powered on and started. FIG. 4 is an initial display of preview type in which the names of applications 1 to 6 are displayed on the left side and a preview of the currently selected application 1 is displayed on the right side. As the preview of the selected application, functions of the selected application may be displayed. In preview display, large amount of information about the application can be displayed.

Figure 5:
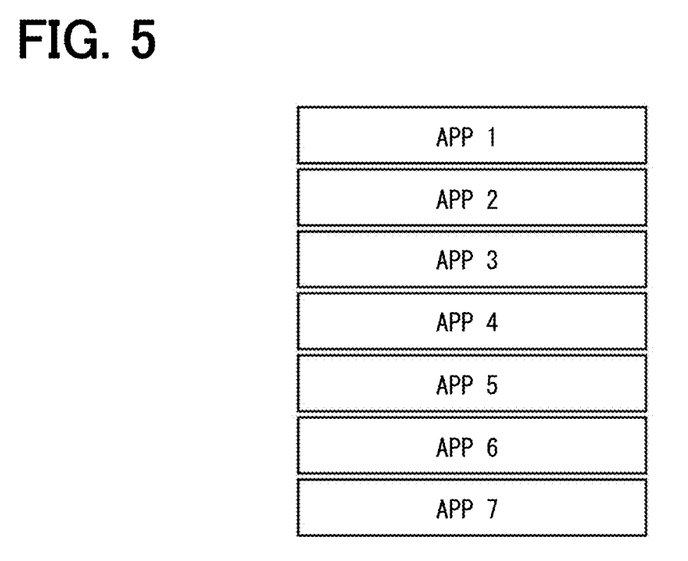
FIG. 5 is a diagram showing another example of the initial display of the operation terminal displayed after the operation terminal is powered on and started.
Figure 6:
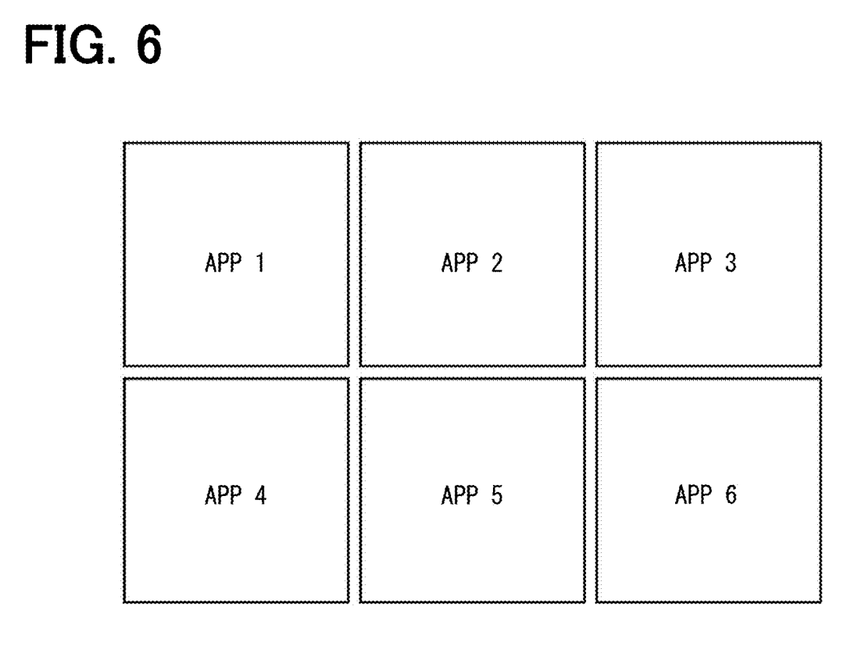
FIG. 6 is a diagram showing another example of the initial display of the operation terminal displayed after the operation terminal is powered on and started.

FIG. 5 is an initial display of list type. In this initial display, only the list displayed on the left side of the initial display shown in FIG. 4 is displayed. FIG. 6 is an initial display of monitor type. In this initial display, entire display image is divided into, for example, 6 to display names of the applications 1 to 6. According to monitor type, entire applications installed in the operation terminal 3 can be presented to the user with good visibility. In particular, the initial display of list type can save display space.

Figure 7:
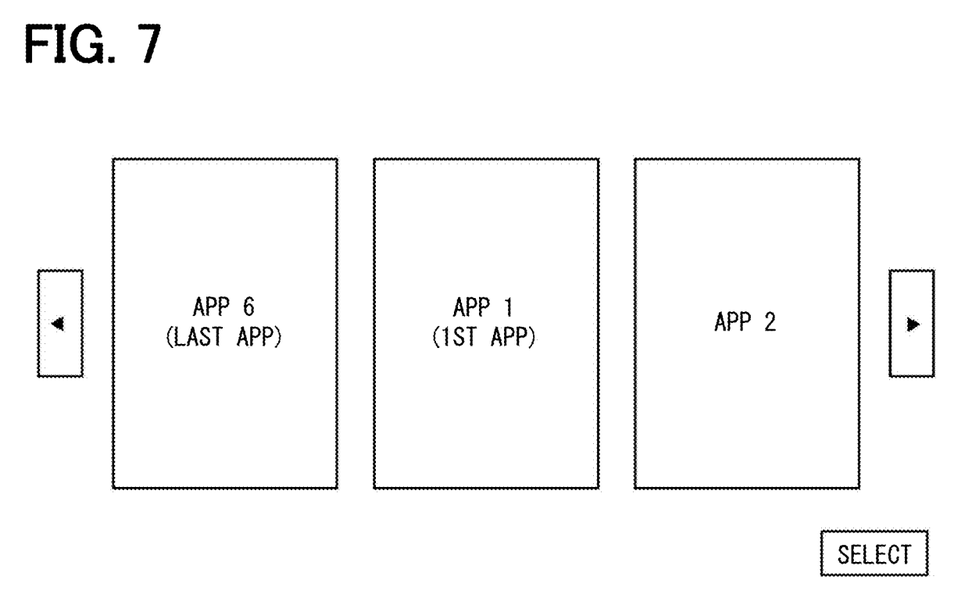
FIG. 7 is a diagram showing another example of the initial display of the operation terminal displayed after the operation terminal is powered on and started.

FIG. 7 is an initial display of carousel type. In this initial display, when the operation terminal has 6 installed applications 1 to 6, the first application 1 is displayed in the center, the second application 2 is displayed on the right side, and the sixth application 6 that is the last application is displayed on the left side of the first application 1. The user operates a cursor to circulate the application to be displayed. The initial display of carousel type is an intermediate display form between the preview type and the list type, and securing of information amount about the application and the saving of the display space can be balanced in the carousel type.

Figure 8:
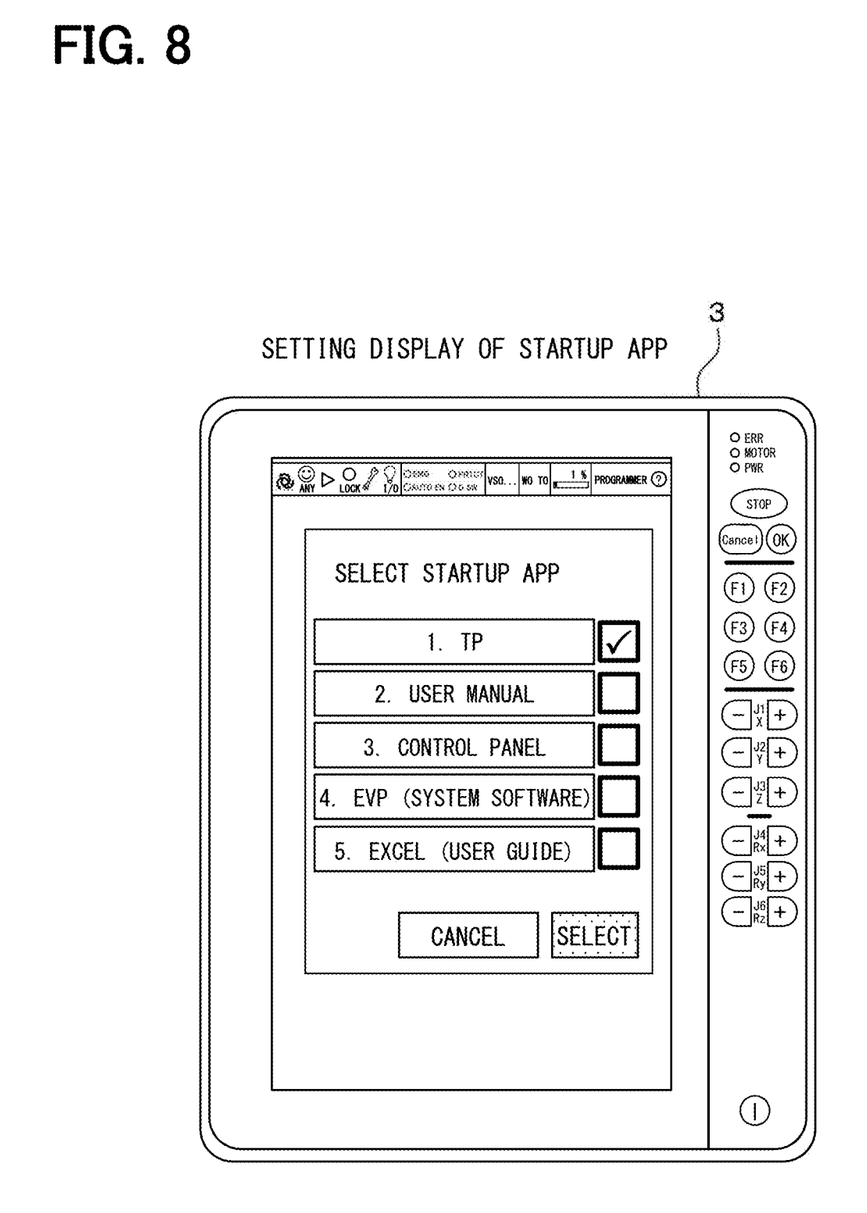
FIG. 8 is a diagram showing a display screen on which startup applications are displayed in list type for an operator to select.
Figure 9:
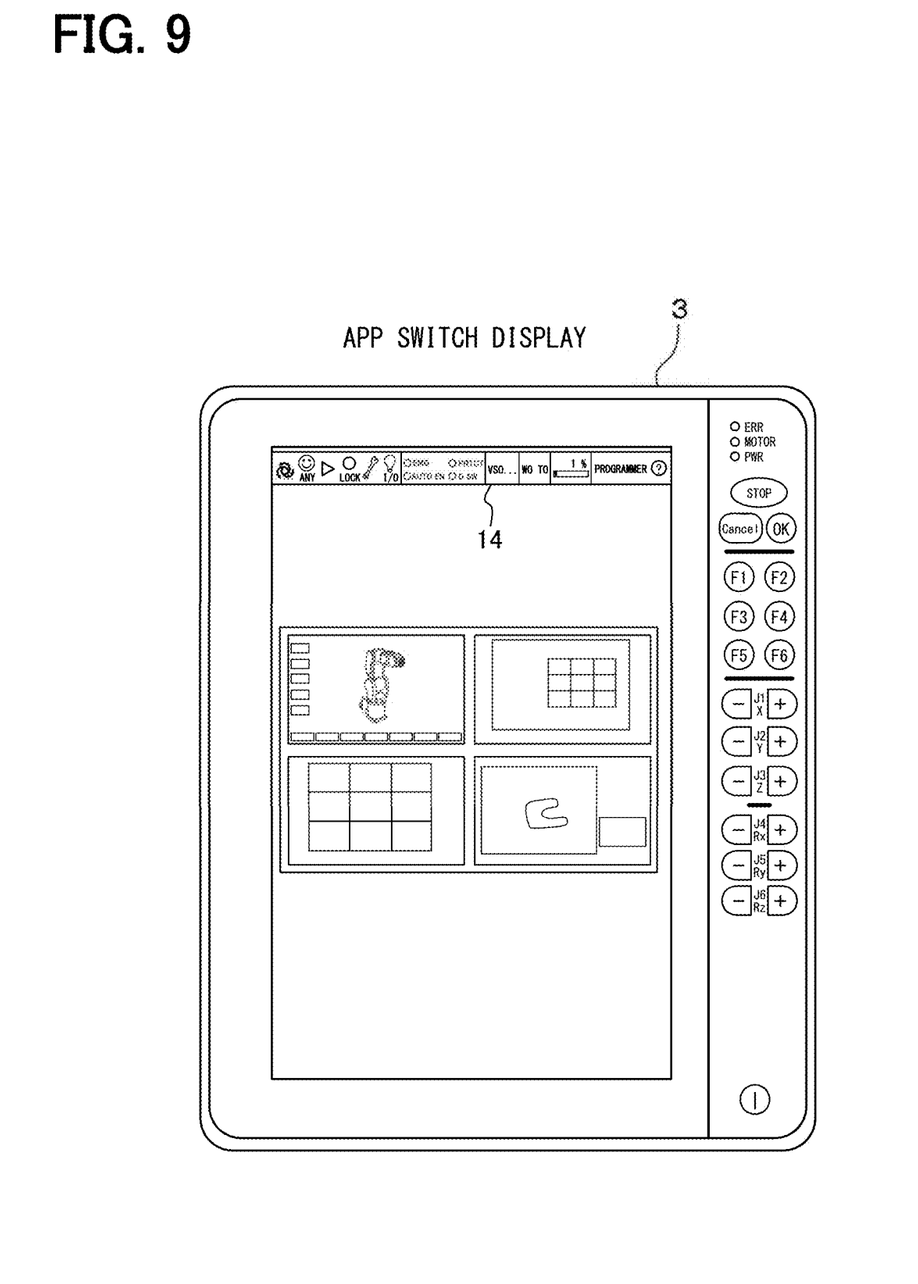
FIG. 9 is a diagram showing a display screen on which startup applications are displayed in monitor type for an operator to select.

FIG. 8 and FIG. 9 show the display screen of the operation terminal 3 in a more realistic manner. FIG. 8 shows the display screen on which startup applications are displayed in the list type for the operator to select. FIG. 9 shows the display screen on which the startup applications are displayed in the monitor type for the operator to select. This is an example of the display screen for the operator to switch the application. A status bar 14 is displayed on an upper end side of the display screens shown in FIG. 8 and FIG. 9. Details of the status bar 14 will be described below.

Figure 10:
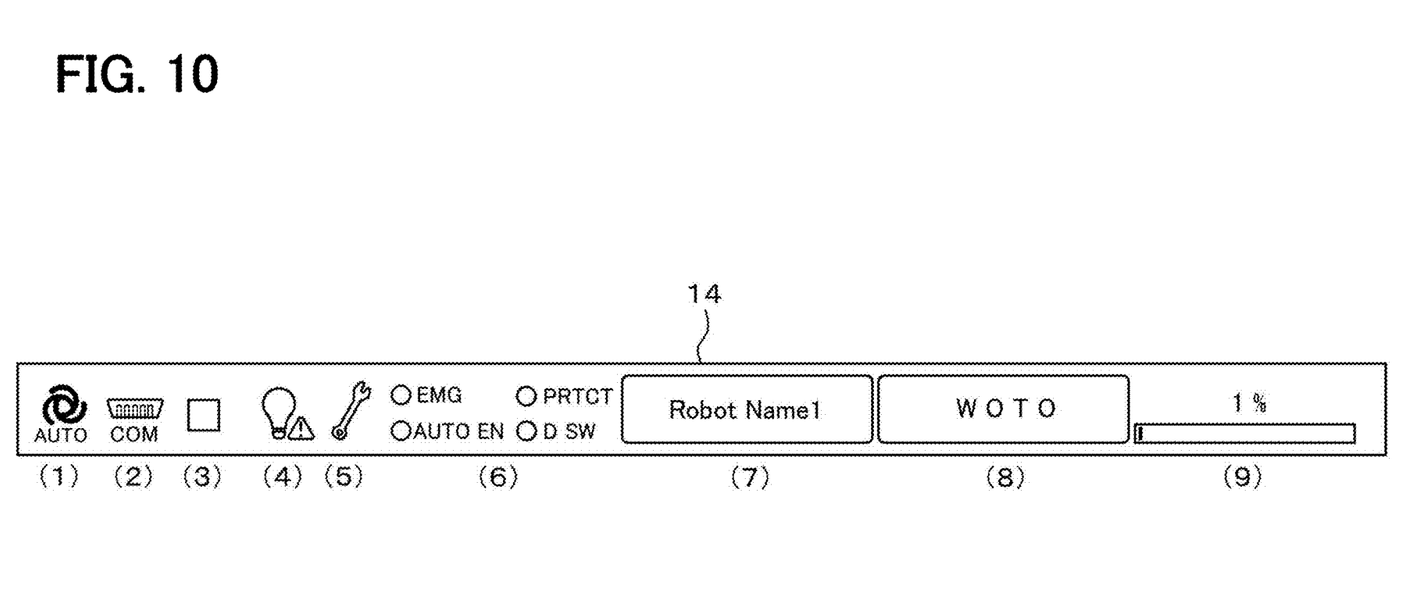
FIG. 10 is a diagram showing an enlarged view of a status bar.

As shown in FIG. 10, on the status bar 14, operation items for switching an operating state of the robot 2 and multiple state information items indicating the operating state of the robot 2 are displayed by symbols.

(1) Mode Switch

An operation item for switching an operation modes among automatic, manual, teach check, remote, and direct.

(2) Activation Right

It is an operation item that can start robot programs such as ANY, Ether, IO, and TP.

(3) Program Execution State

The program execution state displays the state of the program in execution state and in stop state, the privileged task in execution state, the program and privileged task in execution state, message output, and a vicinity of the singular point.

(4) I/O Setting

The I/O setting displays Input/output related settings, such as IO lock, pseudo input, and extended functions.

(5) System Operation State

The system operation state displays the operation state of the system, such as errors occurrence, warnings, and external device connections.

(6) Hard SW State

The hard SW state displays setting state of hardware switches, such as emergency stop, protective stop, automatic enable, and enable switch.

(7) Robot Name

The robot name displays the name of the robot preliminarily input and specified by the user.

(8) Work/Tool Number

The Work/tool number displays the number of work or tool. For example, W0 indicates a target work assigned with No. 0, and T0 indicates a tool assigned with No. 0.

(9) Speed

The speed displays an operation speed of the robot using a percentage.

As described above, according to the present embodiment, the operation terminal 3 has multiple application programs 7 to 9 and 21 to 30 in which the necessity of inbuilt login process for confirming the operation authority for the operator is individually set. Therefore, after confirming the necessity of operation authority according to the functions of the applications 7 to 9 or the like, the operator is permitted to operate the corresponding applications 7 to 9 or the like. This configuration improves the safety of the operation terminal 3 when operating the robot 2 using the operation terminal 3.

The operation terminal 3 is installed with the application management application 10 that manages the process executed in response to an execution of the applications 7 to 9 or the like. In response to the operation terminal 3 being started and the operator starts to input operation, the management application 10 is started first. The management application 10 instructs the operator to execute the management login process for confirming the operation authority of the operator. Subsequently, when the operator selects one application and the selected application is executed, the management application determines whether the operator has the operation authority for the selected application.

In response to determining that the operator has the operation authority, the management application 10 hands over the process to the selected application program. In response to determining that the operator does not have the operation authority, the management application 10 executes the management login process and then hands over the process to the selected application program. In a case where the application program to which the process is handed over requires the inbuilt login, the operator is instructed to perform the inbuilt login process. With this configuration, the operation authority of the operator can be confirmed by the management login process of the management application only. Alternatively, the operation authority can be confirmed in two stages of the management login process in the management application 10 and the inbuilt login process of the selected application. In the configuration where the operation authority of the operator is confirmed by the management login process of the management application only, the operator whose operation authority has been confirmed by the management login process can eliminate the subsequent inbuilt login process of the selected application. Further, with the two-stage confirmation of operation authority, an operation safety of the robot can be further improved.

Among the applications 21 to 30, the applications 22, 25, and 30 require one or more inbuilt login processes having different operation privileges in the execution of the application program. With this configuration, in a case where multiple functions are executed by one application 22 or the like, the operation authority of the operator can be confirmed before the execution according to the content of each function. In a configuration where the operation authority of the operator is set in four stages, the required level of operation authority can be appropriately set according to the functions of the application program.

The operation terminal application 6 is set as the default startup application. By setting the operation terminal application 6 as the startup application, the operator can immediately operate the robot 2 at the field site of the robot 2 without performing inbuilt login process.

The operation terminal 3 displays the status bar 14 in which operation items for switching the operating state of the robot 2 and multiple state information items indicating the operating states of the robot 2 are displayed by symbols. The status bar 14 is displayed on a predetermined portion of the display screen, for example, on the upper end portion of the display screen. With this configuration, the operator can be notified of the operating state of the robot 2 by referring to the status bar 14 during the operation of the robot 2. The operator can easily change the operating state of the robot 2 by operating the displayed operation item.

The present disclosure is not limited only to the embodiment described above or shown in the drawings, and may be modified or expanded as follows.

In response to a start of the operation terminal 3, the program to be started first is not limited to the management application 10. Other applications 7 to 9, 21 to 30, etc. may be set to be started first after power-on of the operation terminal according to the operator's selection.

The items displayed in the status bar 14 are not limited to above-described items (1) to (9). Different items may be selected to be displayed in the status bar 14 as necessary. The number of items displayed in the status bar is not limited to ten. The number may be greater or less than ten.

The display portion of the status bar 14 may be the lower end, the left end, or the right end of the display screen. The display portion of the status bar 14 may be both sides of the upper end and the lower end, both sides of the left end and the right end, or along four ends of the display screen. The status bar 14 may be displayed only when the status bar 14 is needed. That is, when the status bar is not needed, the status bar 14 is not displayed.

The levels of operation authority may be appropriately set as necessary. For example, a risk assessor higher than the administrator may be set, and the operation terminal has five authority levels.

All of the applications installed in the operation terminal may be started up in response to the power-on of the operation terminal.

The inbuilt login process may not be requested at the start of execution of the application. Alternatively, the inbuilt login process may be requested in response to an execution of a function that requires operation authority within the application.

The application that is started first may be an application set in advance by the manufacturer. In this configuration, even if an abnormality occurs in the operation terminal 3, an application that can safely stop the robot 2 may be set with higher priority. The application can safely stop the robot 2 based on monitoring result of the robot 2 by the controller of the robot 2.

The startup applications may be assigned to predetermined priority order. For example, the priority order may be set according to (i) a manufacturer application for operating the robot, (ii) a manufacturer application such as easy vision picking (EVP) and origin return, and (ii) an application selected by the user in described order. The criteria of the priority may be set according to, for example, CPU priority, core allocation in the case of multi core configuration, communication restriction, process monitoring, and the like.

Multiple applications may be executed concurrently. For example, in a case where the screen has sufficient high switching speed, the operation corresponding to each application may be executed in the background. Each application can be individually ended and restarted.

The application management application 10 manages each application by process monitoring. The monitoring targets include, for example, CPU load rate, memory usage rate, survival confirmation, white list, and the like.

In the execution of multiple applications, control to each application is independent from one another, and the adverse effect caused by other applications is eliminated as much as possible.

What is claimed is:

1. A robot operation terminal comprising:
a plurality of application programs,
wherein:
the robot operation terminal is connected to a controller that controls a robot;
the robot operation terminal receives an input operation carried out by an operator to operate or set the robot; and
in each of the plurality of application programs, a necessity of an inbuilt login is set to confirm an operation authority of the operator.

2. The robot operation terminal according to claim 1, wherein
the plurality of application programs include a predetermined application that is started, as a startup application, immediately after the robot operation terminal is powered on.

3. The robot operation terminal according to claim 2, wherein
the predetermined application started as the startup application does not require the inbuilt login of the operator and enables the operator to instruct a basic operation to the robot.

4. The robot operation terminal according to claim 2, further comprising
a management application program that manages processes executed in response to activation of the plurality of application programs,
wherein:
the management application program is configured to be activated before the startup application in response to the input operation carried out by the operator;
the management application program executes a management login which confirms an operation authority of the operator;
the management application program further determines whether the operator has the operation authority to operate one of the plurality of application programs selected by the operator;
in response to determining that the operator having the operation authority, the management application program hands over a process to the one of the plurality of application programs selected by the operator;
in response to determining that the operator not having the operation authority, the management application program executes the management login before handing over the process to the one of the plurality of application programs selected by the operator; and
in a case where the one of the plurality of application programs selected by the operator requires the inbuilt login, the management application program instructs the operator to perform the inbuilt login.

5. The robot operation terminal according to claim 1, wherein
the plurality of application programs include an application program which further requires one or more inbuilt logins having different operation authority levels during an execution of the application program.

6. The robot operation terminal according to claim 5, wherein
the application program which further requires one or more inbuilt logins has three different operation authority levels.

7. The robot operation terminal according to claim 1, further comprising
a display screen which displays a status bar at a predetermined portion of the display screen,
wherein the status bar displays, with use of symbols, an operation item for switching an operation state of the robot and state information items related to the robot.

8. A robot operation terminal comprising:
a processor; and
a memory in which a plurality of application programs are installed, the plurality of application programs being executed by the processor,
wherein:
the memory is a non-transitory tangible computer-readable memory;
the robot operation terminal is connected to a controller that controls a robot;
the robot operation terminal receives an input operation carried out by an operator to operate or set the robot; and
in each of the plurality of application programs, a necessity of an inbuilt login is set to confirm an operation authority of the operator.

9. The robot operation terminal according to claim 8, wherein
the plurality of application programs include a predetermined application that is started as a startup application immediately after the robot operation terminal is powered on.

10. The robot operation terminal according to claim 9, wherein
the predetermined application started as the startup application does not require the inbuilt login of the operator and enables the operator to instruct a basic operation to the robot.

11. The robot operation terminal according to claim 9, wherein:
a management application program is installed in the memory in addition to the plurality of application programs;
the management application program manages processes executed in response to activation of the plurality of application programs;
the management application program is configured to be activated before the startup application in response to the input operation carried out by the operator;
the management application program executes a management login which confirms an operation authority of the operator;
the management application program further determines whether the operator has the operation authority to operate one of the plurality of application programs selected by the operator;
in response to determining that the operator having the operation authority, the management application program hands over a process to the one of the plurality of application programs selected by the operator;
in response to determining that the operator not having the operation authority, the management application program executes the management login before handing over the process to the one of the plurality of application programs selected by the operator; and
in a case where the one of the plurality of application programs selected by the operator requires the inbuilt login, the management application program instructs the operator to perform the inbuilt login.

12. The robot operation terminal according to claim 8, wherein
the plurality of application programs include an application program which further requires one or more inbuilt logins having different operation authority levels during an execution of the application program.

13. The robot operation terminal according to claim 12, wherein
the application program which further requires one or more inbuilt logins has three different operation authority levels.

14. The robot operation terminal according to claim 8, further comprising
a display screen which displays a status bar at a predetermined portion of the display screen,
wherein the status bar displays, with use of symbols, an operation item for switching an operation state of the robot and state information items related to the robot.

15. The robot operation terminal according to claim 1, wherein in each of the plurality of application programs that requires the inbuilt login, the inbuilt login is required at a time that the operator operates the respective application program.

* * * * *